No. 724,196. PATENTED MAR. 31, 1903.
J. MARSHALL.
NUT LOCK.
APPLICATION FILED SEPT. 20, 1902.
NO MODEL.
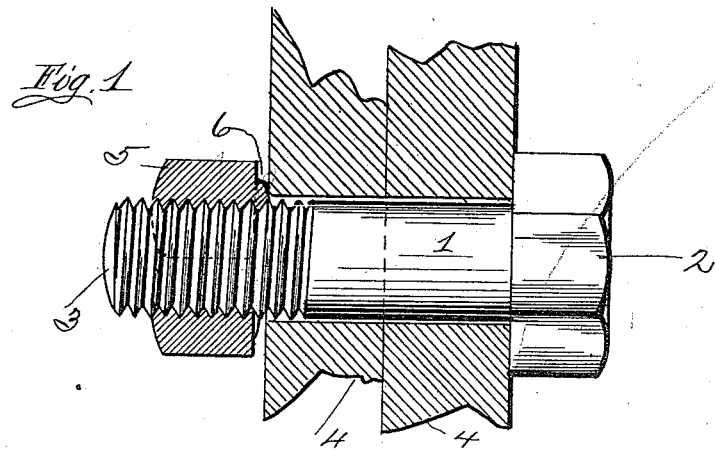
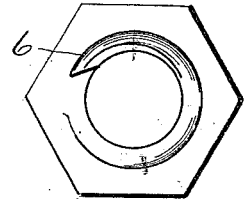

United States Patent Office.

JOHN MARSHALL, OF HARMONY, PENNSYLVANIA.

NUT-LOCK.

SPECIFICATION forming part of Letters Patent No. 724,196, dated March 31, 1903.

Application filed September 20, 1902. Serial No. 124,147. (No model.)

*To all whom it may concern:*

Be it known that I, JOHN MARSHALL, a citizen of the United States, residing at Harmony, in the county of Butler and State of Pennsylvania, have invented a new and useful Improvement in Nut-Locks, of which improvement the following is a specification.

This invention relates to certain new and useful improvements in nut-locks; and the object of the invention is to construct a device embodying an ordinarily-threaded bolt and an ordinarily-threaded nut in which the nut after being tightly screwed up against the object through which the bolt is passed will be securely held against displacement until leverage is applied to the nut to loosen the same.

Briefly described, my invention resides in the construction of the nut, which is provided on its inner face with a beveled boss or flange extending partially around the threaded aperture of the nut, the bevel of this boss or flange being such that as the thicker portion thereof wedges against the face of the object through which the bolt is passed the threads of the bolt and those of the nut are being bound in such a manner as to securely retain the nut against displacement until leverage is applied thereto.

The detail construction of my invention will be hereinafter more specifically described and then particularly pointed out in the claim, and in describing the invention in detail reference will be had to the accompanying drawings, wherein like numerals of reference will be employed for designating like parts throughout the several views, in which—

Figure 1 is a central vertical sectional view of my improved nut-lock, showing the nut in the locked position. Fig. 2 is a plan view of the inside face of the nut, and Fig. 3 is a central vertical sectional view of the nut.

In the accompanying drawings, 1 indicates the bolt, provided with the usual head 2 on one end and having the threaded portion 3, while the numeral 4 represents the objects through which the bolt is passed, these being shown to clearly illustrate my invention.

As stated, my invention resides in the peculiar construction of the nut. This nut 5 is provided with the threads 7 for engagement with the threads 3 of the bolt, and on its inner face this nut is provided with a boss or flange 6, which extends about two-thirds of the way around the threaded aperture of the nut, with the thickest portion 8 of the boss or flange about an equal distance from each end thereof and extending to a point adjacent one end of the flange or boss. This flange or boss tapers abruptly at one end to a meeting plane with the inner face of the nut, while from a point near the center to the other end of the boss or flange the same gradually tapers until the plane of the face is reached, as best seen in Figs. 2 and 3 of the drawings. This boss or flange, it will be observed, is threaded—that is, one thread of the nut terminates in the boss or flange.

In operation the nut is threaded onto the bolt in the ordinary manner until the boss or flange engages the face of the adjacent part or element 4. When the wrench is applied to the nut, the boss or flange frictionally engages the face of the part or element 4, as shown in Fig. 1, and at this time the inner face of the nut below the bolt will be free from engagement with the part 4. The nut being thus engaged at one side of the bolt and free at the other side thereof, the threads of the nut and those of the bolt are caused to frictionally engage, and as the pressure is increased the thread in the flange or boss partially "cants" or crosses that of the bolt, effectually locking the nut and preventing displacement thereof until the wrench is applied thereto.

Having fully described my invention, what I claim as new, and desire to secure by Letters Patent, is—

In a nut-lock, the combination with the threaded bolt, of a nut threaded on said bolt and provided on its inner face with a mutilated boss or flange having an interior thread, said boss or flange at one end tapering abruptly to the plane of the inner face of the nut and tapering gradually from a point about its center to the other end, substantially as described.

In testimony whereof I have hereunto signed my name in the presence of two subscribing witnesses.

JOHN MARSHALL.

In presence of—
LOUIS MOESER,
C. STEVENS.